(12) United States Patent
Patel

(10) Patent No.: US 10,459,677 B2
(45) Date of Patent: Oct. 29, 2019

(54) COORDINATION OF DEVICE OPERATION ON WIRELESS CHARGING SURFACE

(71) Applicant: Apple Inc., Cupertino, CA (US)

(72) Inventor: Parin Patel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 15/616,292

(22) Filed: Jun. 7, 2017

(65) Prior Publication Data

US 2018/0052649 A1 Feb. 22, 2018

Related U.S. Application Data

(60) Provisional application No. 62/377,269, filed on Aug. 19, 2016.

(51) Int. Cl.

| | |
|---|---|
| *G06F 3/14* | (2006.01) |
| *H02J 50/40* | (2016.01) |
| *H02J 50/90* | (2016.01) |
| *H04W 4/02* | (2018.01) |
| *H04W 4/00* | (2018.01) |
| *H04W 4/80* | (2018.01) |
| *H02J 50/10* | (2016.01) |

(52) U.S. Cl.
CPC ............ *G06F 3/1423* (2013.01); *H02J 50/10* (2016.02); *H02J 50/40* (2016.02); *H02J 50/90* (2016.02); *H04W 4/026* (2013.01); *H04W 4/80* (2018.02)

(58) Field of Classification Search
CPC ......... G06F 3/1423; H02J 50/40; H02J 50/90; H04W 4/008; H04W 4/026
USPC ........................................................ 320/108
See application file for complete search history.

(56) References Cited

U.S. PATENT DOCUMENTS

| | | | |
|---|---|---|---|
| 7,772,802 B2* | 8/2010 | Manico et al. ......... | H02J 50/10 320/108 |
| 9,148,201 B2* | 9/2015 | Kallal et al. ............ | H02J 5/005 |
| 9,209,627 B2 | 12/2015 | Baarman et al. | |
| 9,472,963 B2* | 10/2016 | Van Wiemeersch et al. ............... | H04B 5/0037 |
| 10,084,321 B2* | 9/2018 | Von Novak, III et al. .................. | H02J 5/005 |
| 2008/0258679 A1 | 10/2008 | Manico et al. | |
| 2012/0212178 A1 | 8/2012 | Kim | |

(Continued)

FOREIGN PATENT DOCUMENTS

WO 2015099914 A1 7/2015

*Primary Examiner* — Sun J Lin
(74) *Attorney, Agent, or Firm* — Treyz Law Group, P.C.; Michael H. Lyons

(57) ABSTRACT

Portable electronic devices may be wirelessly charged while resting on a wireless charging surface of a wireless power transmitting device. The wireless power transmitting device may have an array of coils for transmitting wireless power. The portable electronic devices may have coils for receiving the transmitted wireless power. Magnetic sensors may be used in the portable electronic devices to sense magnetic fields produced by the wireless power transmitting device. The magnetic fields may be produced by permanent magnets, electromagnets that are separated from the coils, or coils in the array of coils. Sensors may also be used in the portable electronic devices and wireless power transmitting device such as sound sensors, light sensors, capacitive sensors, proximity sensors, and other sensors. These sensors may be used in measuring lateral position and orientation for the portable devices so that content may be displayed across multiple portable devices.

31 Claims, 7 Drawing Sheets

(56) References Cited

U.S. PATENT DOCUMENTS

| | | |
|---|---|---|
| 2013/0099776 A1 | 4/2013 | Wu et al. |
| 2014/0002013 A1 | 1/2014 | Kossi et al. |
| 2014/0217965 A1* | 8/2014 | Van Wiemeersch et al. ............... H04B 5/0037 320/108 |
| 2015/0022194 A1 | 1/2015 | Almalki et al. |
| 2016/0025477 A1 | 1/2016 | Madau et al. |
| 2016/0072334 A1 | 3/2016 | Wu |
| 2016/0190851 A1 | 6/2016 | Pudipeddi et al. |
| 2017/0005481 A1* | 1/2017 | Von Novak, III et al. ................. H02J 5/005 |

* cited by examiner

COORDINATION OF DEVICE OPERATION ON WIRELESS CHARGING SURFACE

This application claims the benefit of provisional patent application No. 62/377,269, filed Aug. 19, 2016, which is hereby incorporated by reference herein in its entirety.

FIELD

This relates generally to wireless systems, and, more particularly, to systems in which devices are wirelessly charged.

BACKGROUND

In a wireless charging system, a wireless charging surface may wirelessly transmit power to a portable electronic device that is placed on the surface. The portable electronic device may receive the wirelessly transmitted power and may use this power to charge an internal battery or to power the device. In some situations, multiple devices may be placed on a wireless charging surface.

SUMMARY

Portable electronic devices may be wirelessly charged while resting on a wireless charging surface of a wireless charging surface (e.g., a wireless charging device such as a wireless charging mat, wireless charging puck, wireless charging stand, wireless charging table, or other wireless power transmitting device). The wireless power transmitting device may have an array of coils for transmitting wireless power. The portable electronic devices may have coils for receiving the transmitted wireless power.

Magnetic sensors may be used in the portable electronic devices to sense magnetic fields produced by the wireless power transmitting device. The magnetic fields may be produced by permanent magnets, by electromagnets that are separate from the coils, or by coils in the array of coils. Other sensors may also be used in the portable electronic devices and wireless power transmitting device such as sound sensors, light sensors, capacitive sensors, proximity sensors, force sensors, and other sensors. Magnetic sensors and other sensors may be used in measuring lateral position and orientation for the portable devices. For example, sensor readings may be used to determine the relative position and orientation of a pair of devices on a wireless charging surface and to determine the relative position of each of the pair of devices relative to the wireless charging surface. Gyroscopes may be used to track changes in rotational orientation as devices are moved.

A wireless power transmitting device may obtain device identifiers from some or all of the devices on the wireless charging surface. These identifiers may then be shared among compatible devices on the wireless charging surface so that the devices may wirelessly communicate with each other. Once paired, wireless devices on the charging surface may be assigned master and slave roles. A master device may wirelessly stream content to one or more slave devices. The relative positions and orientations of the devices on the wireless charging surface may be used in coordinating the presentation of content on the displays of the devices. In this way, a video from a master device or other source may be split into halves each of which is displayed on a respective device or content such as a screen saver or document may stretch across multiple devices on a charging surface. Information on the relative position and angular orientation of each device on the charging surface may be taken into account so that the content is displayed appropriately.

DETAILED DESCRIPTION

A wireless power system may have a wireless power transmitting device such as a wireless charging mat, wireless charging puck, wireless charging stand, wireless charging table, or other wireless power transmitting equipment. The wireless power transmitting device may have one or more coils that are used in transmitting alternating-current electromagnetic signals to wireless power receiving devices. An array of coils may be formed under a wireless charging surface. The wireless power transmitting device may wirelessly transmit power to the wireless power receiving devices when the wireless power receiving devices are resting on the wireless charging surface. The wireless power receiving devices may be portable electronic devices.

Components in the wireless power transmitting equipment and components in the wireless power receiving devices may determine the location and orientation of wireless power receiving devices relative to the wireless charging surface and each other. Using information on the relative position and angular orientation of the wireless power receiving devices, coordinated action may be taken. For example, a screen saver, video, image, document, or other content may be displayed across multiple receiving devices. Each receiving device may display a respective portion of the content. If, as an example, receiving devices are adjacent to each other, a first half of the content may be displayed on a first of the receiving devices and a second half of the content that is adjacent to the first half may be displayed on a second of the receiving devices. In illustrative configurations in which the first and second devices are misaligned with respect to each other and/or are spaced apart from each other, the first and second devices may be used to display respective first and second smaller portions of a single large image or other visual content (as an example).

Sensors and other components may be provided in the wireless power transmitting device and/or the wireless power receiving devices. These sensors and other components may be used in identifying the positions and orientations of the wireless power receiving devices. For example, the sensors and other components may be used to identify information that represents the location and/or orientation of each wireless power receiving device relative to the wireless power transmitting device and/or relative to each other. Content may then be displayed on the wireless power receiving devices based on the relative position and/or orientation between the wireless power receiving devices, based on the relative position and/or orientation between one or both wireless power receiving devices and the power transmitting device, and/or based on other information gathered using the sensors and other components.

Figure 1:
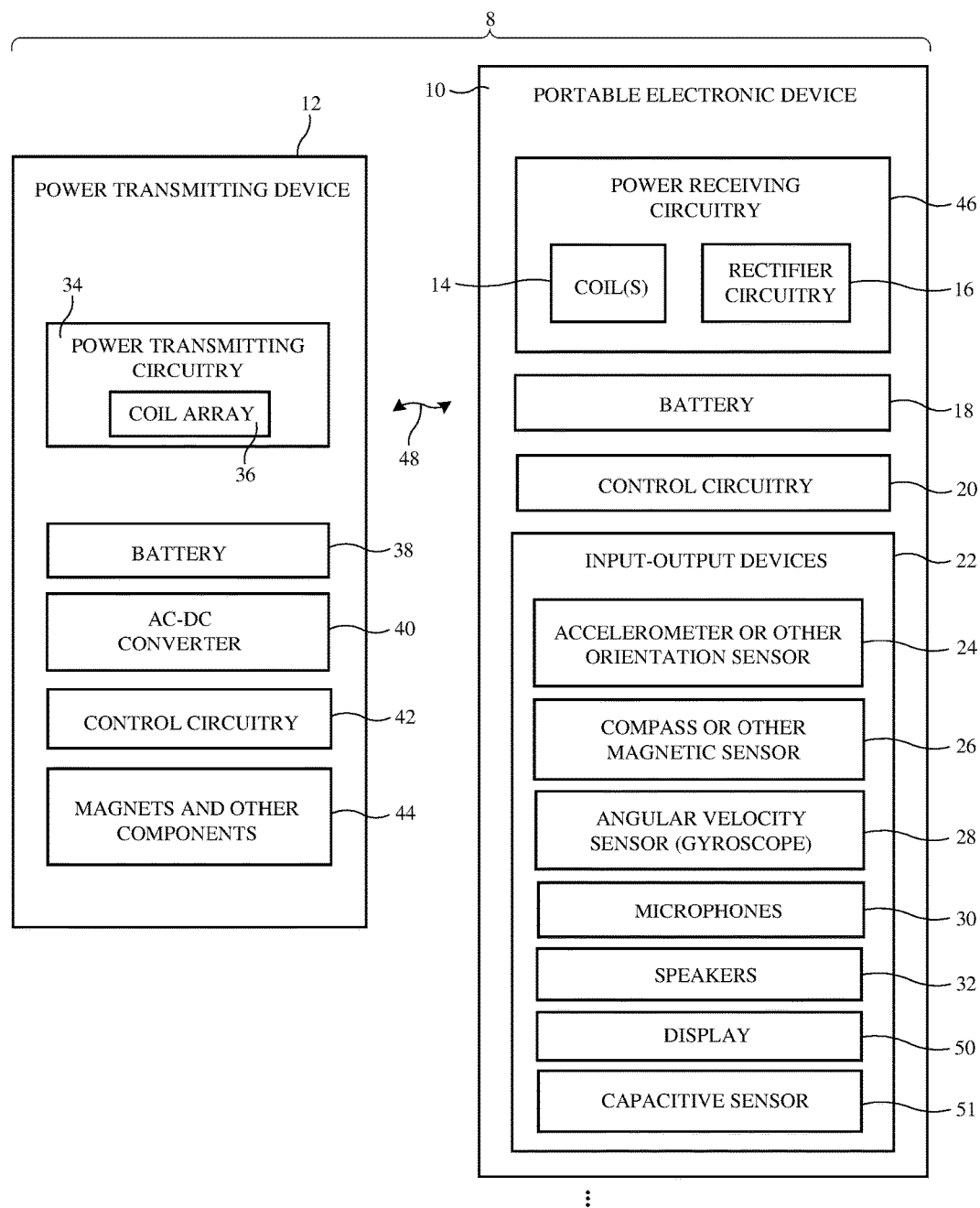
FIG. 1 is a schematic diagram of an illustrative wireless charging system in accordance with an embodiment.

An illustrative wireless power system (wireless charging system) is shown in FIG. 1. As shown in FIG. 1, wireless power system 8 may include a wireless power transmitting device such as wireless power transmitting device 12 and may include one or more wireless power receiving devices 10.

Power transmitting device 12 may be a stand-alone power adapter (e.g., a wireless charging mat, puck, stand, table, or other device that includes power adapter circuitry mounted under a planar dielectric layer that serves as a wireless charging surface), may be a wireless charging device that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging device with a wireless charging surface may sometimes be described herein as an example.

Each power receiving device 10 in system 8 may be a portable electronic device such as a wristwatch, a cellular telephone, a laptop computer, a tablet computer, or other electronic equipment. Power transmitting device 12 may be coupled to a wall outlet (e.g., a source of alternating-current voltage), may have a battery such as battery 38 for supplying power, and/or may have another source of power. Power transmitting device 12 may have an AC-DC power converter such as power converter 40 for converting AC power from a wall outlet or other power source into DC power. DC power may be used to power control circuitry 42 and other circuitry in device 12. During operation, a controller in control circuitry 42 may use power transmitting circuitry 34 and one or more coils such as coil array 36 in circuitry 34 to transmit alternating current electromagnetic signals 48 to device 10 and thereby convey wireless power to power receiving circuitry 46 of device 10. Power transmitting circuitry 34 may have switching circuitry (e.g., transistors) that are turned on and off based on control signals provided by control circuitry 42 to create AC current signals through one or more coils in coil array 36. As the AC currents pass through coil array 36, alternating-current electromagnetic fields (signals 48) are produced that are received by corresponding coil(s) 14 of power receiving circuitry 46 in receiving device 10. When the alternating-current electromagnetic fields are received by coil 14, corresponding alternating-current currents and voltages are induced in coil 14. Rectifier circuitry 16 in circuitry 46 may convert received AC signals (received alternating-current currents and voltages associated with wireless power signals) from coil(s) 14 into DC voltage signals for powering device 10. The DC voltages may be used in powering components in device 10 such as a display, touch sensor components, wireless circuits, audio components, and other components (e.g., input-output devices 22 and/or control circuitry 20) and may be used in charging an internal battery in device 10 such as battery 18.

Devices 12 and 10 may include control circuitry 42 and 20. Control circuitry 42 and 20 may include storage such as read-only memory, random-access memory, hard drive storage, flash drive storage, removable storage medium, or other computer-readable media and may include processing circuitry such as microprocessors, power management units, baseband processors, digital signal processors, microcontrollers, and/or application-specific integrated circuits with processing circuits. Control circuitry 42 and 20 may be configured to execute instructions for implementing desired control and communications features in system 8 (e.g., arrangements in which information is gathered on device positions and/or orientations, in which information is exchanged on device identifiers and other identifying information, arrangements in which content is streamed and otherwise conveyed between equipment in system 8, etc.).

Device 12 and/or device 10 may communicate wirelessly using in-band or out-of-band communications. Devices 10 and 12 may, for example, have wireless transceiver circuitry in control circuitry 42 and 20 that allows wireless transmission of signals between devices 10 and 12 (e.g., using antennas, using coils 36 and 14, etc.).

Device 12 and device(s) 10 may include components that can be used in determining the lateral positions and angular orientations of devices 10 relative to the charging surface of device 12 and/or each other. As shown in FIG. 1, for example power transmitting device 12 may include magnets and other components 44 (e.g., audio transducers, wireless circuitry, sensors, etc.) and device 10 may include input-output devices 22. Using this circuitry, device 12 may gather signals from devices 10 and devices 10 may gather signals from device 12. Devices 10 and/or 12 may then process this information individually and/or together to determine how devices 10 are located and oriented relative to device 12 and/or to each other.

Components 44 may include components that supply signals such as permanent magnets, electromagnets that are separate from coil array 36, electromagnets formed from one or more coils in array 36, audio output devices such as speakers and other audio transducers, antennas for transmitting electromagnetic signals for use in time-of-flight measurements, metal strips for creating capacitance signals (electric field perturbations) that may be monitored by a touch sensor in input-output devices 22, light sources such as light-emitting diodes for emitting light that is measured by light sensors in devices 22, and/or other output components. Components 44 may also include components that measure signals (e.g., microphones, antennas, magnetic sensors, capacitive touch sensors, light sensors, force sensors, etc.).

Input-output devices 22 may include an orientation sensor such as accelerometer 24, a magnetic sensor such as compass 26, an angular velocity sensor such as gyroscope 28 (e.g., a gyroscope that control circuitry 20 can use to track changes in the angular orientation of device 10 due to movement of device 10 by a user, microphones 30, antennas, force sensors, and other sensors for measuring signals from components 44 and other circuitry associated with device 12. The sensors and other signal measuring components of devices 22 may also make measurements on the environment surrounding devices 12 and 10. Input-output devices 22 may include components for producing output signals such as display 50 (e.g., a touch screen display), capacitive sensor 51 (e.g., a capacitive touch sensor in display 50, a separate capacitive touch sensor, one or more capacitive sensor buttons, or one or more other capacitive sensors), speakers 32, electromagnets (e.g., electromagnets associated with speakers 32, stand-alone electromagnets, and/or electromagnet(s) formed by coil(s) 14), antennas, light sources, etc.

Figure 2:
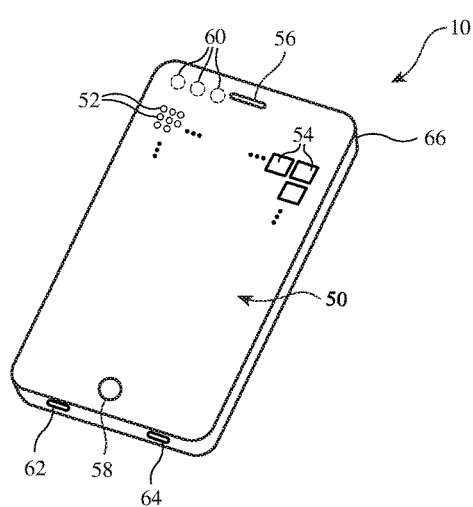
FIG. 2 is a perspective view of an illustrative portable electronic device in accordance with an embodiment.

A perspective view of an illustrative portable electronic device is shown in FIG. 2. As shown in FIG. 2, device 10 may include a housing such as housing 66. Housing 66 may have a rectangular footprint (outline when viewed from above) or may have any other suitable shape. Housing 66 may be formed from metal, plastic, fiber-composite materials, glass, and/or other dielectric and/or conductive materials.

Display 50 may be mounted in housing 66. Display 50 may include an array of pixels 52 for displaying images for a user. Display 50 may be an organic light-emitting diode display, a liquid crystal display, or other suitable display. If desired, display 50 may be a touch sensitive display having a capacitive touch sensor overlapping the pixel array formed from pixels 52. For example, display 50 may have a capacitive touch sensor with an array of capacitive touch sensor electrodes 54 formed from indium tin oxide or other transparent conductive material. Electrodes 54 may overlap pixels 52.

Device 10 may include speakers 32 in ear speaker port 56 and, at an opposing end of housing 66, in speaker port 64. Microphones 30 may be located in speaker port 56, speaker port 64, and/or microphone port 62. Display 50 may have a cover layer with an opaque masking layer under an inactive border region. Windows 60 may be formed in the opaque masking layer and may be associated with an ambient light sensor, a light-based proximity sensor having an infrared transmitter and corresponding infrared detector for measuring reflected infrared light, and a camera (e.g., a digital image sensor). Menu button 58 and other buttons may be used to gather user button press input. Device 10 may also include other components (see, e.g., input-output devices 22 of FIG. 10).

Figure 3:
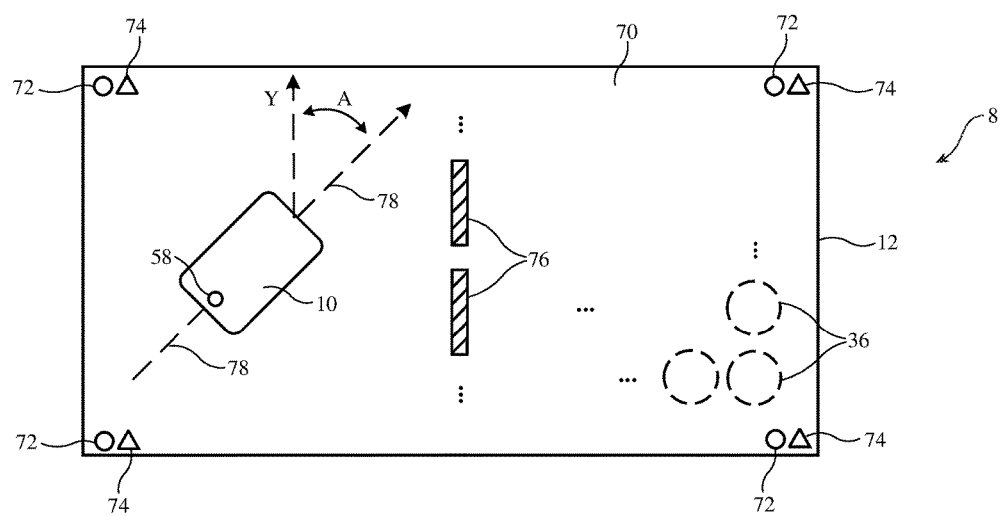
FIG. 3 is a diagram of an illustrative portable electronic device on a wireless charging surface in accordance with an embodiment.
Figure 3:
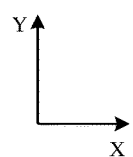

A top view of an illustrative wireless power transmitting device 12 is shown in FIG. 3. As shown in FIG. 3, an array of coils 36 may be formed under charging surface 70. When it is desired to receive wireless power from device 12, a user may place one or more devices 10 on surface 70. Due to the presence of coils 36 and one or more overlapping coils 14 in device 10, wireless power may be conveyed between device 12 and devices such as device 10.

To coordinate the playback of visual content on the displays of multiple portable devices, it may be desirable to gather information on the location of each of devices 10. This may be accomplished by transmitting signals from device 12 that are measured by each device 10 and/or by transmitting signals from each device 10 that are measured by device 12.

As an example, device 12 may include components 44 that emit signals such as components 72. Components 72 may be located at the corners of surface 70, may be formed in an array across surface 70, may be formed along the edges of surface 70, and/or may be arranged in other patterns in device 12. Components 72 may include permanent magnets and/or electromagnets for emitting permanent magnetic fields that are sensed by compass 26. Compass 26 may also measure magnetic fields generated by one or more of coils 36 (e.g., when those coils 36 are used as electromagnets). If desired, components 72 may include antennas that emit electromagnetic signals that are processed to make time-of-flight position and/or orientation measurements. Components 72 may also be light-emitting diodes or other light sources that emit light, speakers or other audio output devices that emit sound (e.g., ultrasonic tones or other ultrasonic signals, etc.), may be haptic devices that emit vibrations, and/or may be other devices that emit signals for measurement by input-output devices 22 of devices 10. If desired, device 12 may include a pattern of metal strips or other passive devices that are detectable (via fringing electric fields) using the array of capacitive touch sensor electrodes 54 in each device 10.

As another example, device 12 may include sensing components 74 for making measurements on signals emitted by device 10 for use in determining position and/or orientation information. Device 10 may, for example, have antennas that emit electromagnetic signals that antennas in components 74 sense to make time-of-flight measurements. Device 10 may also emit ultrasonic tones (e.g., a pair of unique tones using respective speakers at opposing ends of device 10 such as at port 56 and port 64) that are detected using microphones in components 74. Components 74 may, in general, include light sensors for measuring light from devices 10, antennas, magnetic sensors, force sensors, microphones, touch sensors, proximity sensors, and/or other sensors.

If desired, coils 36 and/or coil 14 may be used in gathering information on position and/or orientation. As an example, coils 36 may be used as magnetic sensors. Device 10 may emit magnetic fields that are detected using coils 36. The magnetic fields may be emitted by coil 14, by electromagnets such as speaker coils in speakers 32, and/or by other magnetic field emitting devices. In some configurations, signals emitted by coils 36 may be detected by coil 14. For example, device 12 may systematically emit signals through each of coils 36 in a known search pattern. Device 10 can determine the location of coil 14 on the coil array of coils 36 (i.e., the position of device 10 in lateral coordinates X-Y on charging surface 70) by monitoring when coil 14 detects the systematically emitted signals (sometimes referred to as "pings"). Coil 14, speakers 32, and/or other electromagnetic signal source in device 10 can also emit magnetic signals that are detected using coil array 36 to determine the position and/or orientation of device 10. Orientation may, if desired, be tracked in real time using a gyroscope in device 10.

Position information in system 8 may be gathered and processed to produce portable device position data using any suitable coordinate system. For example, the position of each device 10 may be gathered using a Cartesian X-Y coordinate system that is referenced to the location of charging surface 70. Device orientation information may be gathered by measuring the amount of angular rotation A of device 10 with respect to a fixed axis (e.g., angle A of FIG. 3 represents the amount of clockwise angular rotation of longitudinal axis 78 of device 10 with respect to fixed vertical axis Y, which is aligned with the vertical left and right edges of wireless charging surface 70 in the FIG. 3 example). By gathering information on the X-Y position and angular orientation (angle A) of each device 10 on charging surface 70 of device 12 (e.g., in translational XY coordinates and in angular coordinate A), the equipment of system 8 may identify the relative position and/or orientation of devices 10 with respect to device 12 (charging surface 70) and with respect to each other. This information may then be used in coordinating the operation of devices 12 and 10. For example, media playback operations can be coordinated so that different portions of a video or other visual content can be presented simultaneously on each of multiple devices, accounting for the different respective positions and angular orientations of devices 10 relative to each other and/or device 12 so that the content is not distorted (e.g., so that the one portion of displayed content is not angled at a non-zero angle with respect to another portion of the displayed content).

Figure 4:
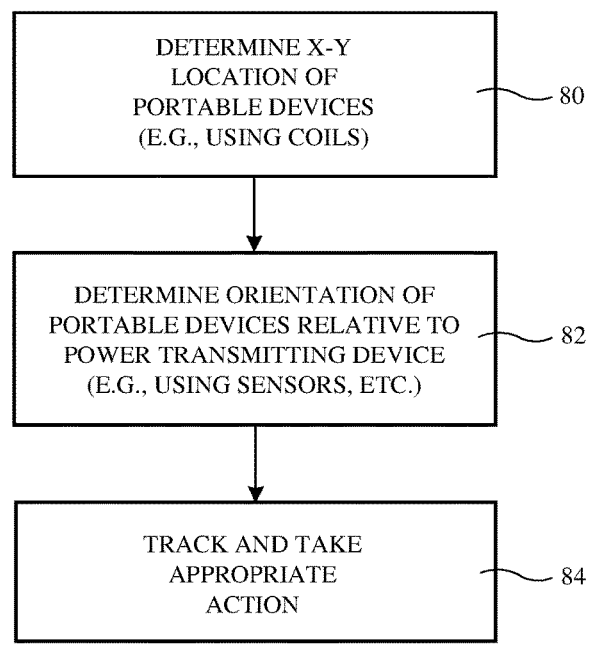
FIG. 4 is a flow chart of illustrative operations involved in gathering information on the location and orientation of portable electronic devices relative to a wireless charging surface in and each other accordance with an embodiment.

FIG. 4 is a flow chart of illustrative operations that may be used in system 8 to determine device locations and take suitable action.

At step 80, lateral device positions (e.g., the locations on surface 70 in XY coordinates) may be determined. For example, control circuitry 42 and 20 may use the signal emitting components and signal sensing components of system 8 (e.g., components 44, input-output devices 22, coils 36, coil(s) 14, etc.) to determine the lateral position of each device 10. With one illustrative arrangement, control circuitry 42 uses each of coils 36 to emit a known signal (a "ping") while coil 14 is used by control circuitry 20 to monitor for incoming signals. Based on knowledge of the location of the coil 36 that emits the ping signal when coil 14 detects an incoming signal, the location of device 10 (i.e., the location at which coil 14 overlaps the pinging coil 36) can be determined. Information on device location can be stored in devices 10 and/or device 12 or other suitable equipment.

After determining the XY position of each device 10 by determining which of coils 36 is overlapped by the coil 14 of that device 10, control circuitry 42 and/or 20 may use components 44 and other components (e.g., input-output devices 22) in system 10 to determine the angular orientation of devices 10 at step 82. Examples of techniques that may be used in determining angular device orientation include emitting magnetic fields with coils 36, permanent magnets, and/or electromagnets at known locations in device 12 (e.g., permanent magnets that establish a magnetic field aligned with the Y axis or other axis that can serve as a reference direction, electromagnets or coils that are actuated in sequence to support triangulation operations, etc.) and detecting these fields using a compass in each device 10, using antennas in device 12 to emit signals that are detected and processed to determine orientation (e.g., using time-of-flight techniques), emitting acoustic signals such as ultrasonic signals with device 12 that are detected using microphones in devices 10 (e.g., to support acoustic triangulation), emitting vibrations in device 12 that are detected using force sensors or other sensors in device 10, detecting the locations of metal strips 76 with capacitive touch sensor electrodes on displays 50 in devices 10, emitting light from known positions in device 12 that is detected using light sensors in devices 10, and/or other techniques for emitting signals with device 12 and determining the orientation of devices 10 by measuring these signals with devices 10. Additional examples of techniques that may be used in determining angular device orientation involve emitting signals with devices 10 that are detected using sensors in device 12. For example, devices 10 may emit magnetic fields using speaker coils and/or coils 14 or other magnetic-field-generating components and these signals can be detected using magnetic sensors in device 12 or coils 36 in device 12, devices 10 can emit light from known locations that is measured using light detectors in device 12, device 12 may use touch sensor electrodes or other sensor array structures to detect the locations of housing 66 on surface 70, devices 10 may emit ultrasonic tones or other sound and microphones in device 12 can measure these signals, and/or other signals can be generated by devices 10 and measured using sensors in device 12. If desired, the operations of block 82 may produce sufficient information to identify both the angular orientation of each device 10 and the XY position of each device 10. In this type of situation, the use of the electromagnetic ping signals produced during the operations of block 80 may be omitted (as an example).

During the operations of blocks 80 and 82, position and orientation information may be gathered that specifies where devices 10 are located relative to each other and relative to charging surface 70. If, for example, device 10 determines that a first of devices 10 is located at a first location relative to device 12 and determines that a second of devices 10 is located at a second location relative to device 12, both the locations of each device 10 relative to device 12 and the locations of devices 10 relative to each other will have been obtained. Information on relative and/or absolute XY position and device angular orientation may be exchanged between devices wirelessly and may be maintained on one or more of devices 10 and/or on device 12. This information may then be used in taking appropriate coordinated action with multiple devices 10 (block 84).

As an example, consider a media playback scenario. One of devices 10 may serve as a master device and one or more additional devices (e.g., a single additional device) may serve as a slave device. A user may supply manual input (e.g., a touch input, voice command, etc.) to select a desired master device and/or an automatic process running on a device in system 8 may select the master device automatically. A user may also supply input to direct a master device to display a video, a screen saver, a document, a menu screen or other operating system screen, an image, or other visual content on multiple devices 10. When displaying visual content in this way, the position and orientation of each of devices 10 may be taken into account so that content is not distorted (e.g., so that content is not displayed at different angular orientations on different devices). For example, a first portion of a video may be displayed on a first device 10 and a second portion of a video may be displayed on a second device 10 that is adjacent to the first device. If the orientation of the second device is flipped by 180° (e.g., so that the adjacent devices are aligned tops to bottoms instead of tops to tops and bottoms to bottoms), the second portion of the video may likewise be flipped by 180°, so that a user can view the video correctly on the first and second devices. During the operations of block 84, devices 10 and device 12 can communicate to share position and orientation information, to share information on which device is a master and which is a slave (e.g., to allow device 12 to name one of devices 10 such as the initial device 10 to communicate with device 12 as the master), to exchange device identifiers to support device-to-device wireless media streaming operations (e.g., wireless local area network device identifiers such as Bluetooth® identifiers, peer-to-peer WiFi® identifiers, other device identifiers, etc.), and to otherwise coordinate device operations.

Figure 5:
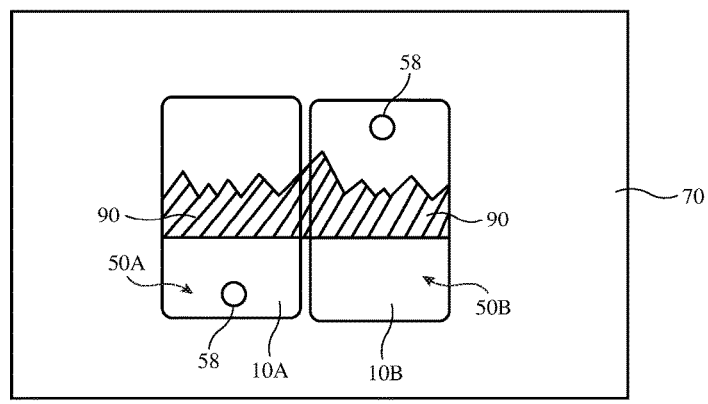
FIGS. 5 and 6 are diagrams showing how the display of video or other content may be coordinated across multiple devices on a wireless charging surface while taking into account information on the relative lateral position and rotational orientation of the devices in accordance with an embodiment.
Figure 6:
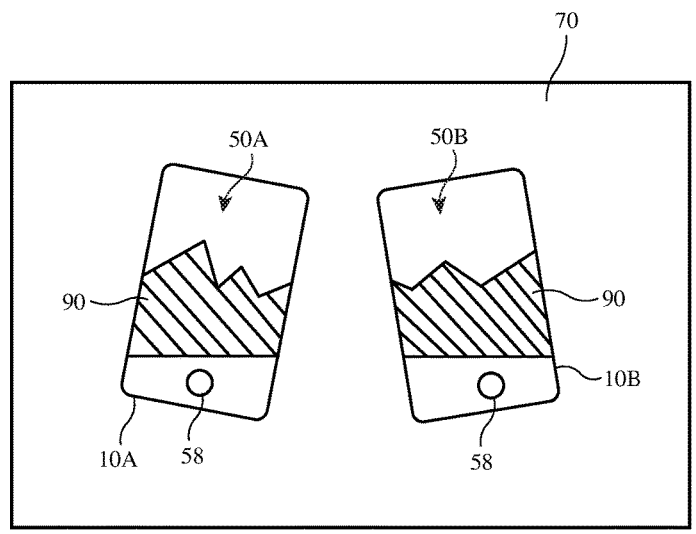

FIGS. 5 and 6 are diagrams showing how the presentation of content across multiple devices 10 can be adjusted based on device position and orientation. In the example of FIG. 5, device 10A and device 10B are located adjacent to each other on wireless charging surface 70. The top of device 10A is aligned with the bottom of device 10B and vice versa. Information on the positions of devices 10A and 10B may be used to confirm that devices 10A and 10B are adjacent and to confirm that device 10A is right-side up and device 10B is upside down. After establishing a master device among devices 10A and 10B (e.g., after establishing device 10A as a master device and 10B as a slave device), the master device (10A) may display a first half of a video (or other content) 90 on display 50A. The master device 10A may also stream the entire video or the second half of the video 90 (or other content) to device 10B so that device 10B may display the second half of the video (or other content) on display 50B. Devices 10A and/or 10B may know the position and orientation of devices 10A and 10B, so that the video (or other content) on device 10B can be inverted during playback (so that the video or other content on device 10B appears to be seamlessly extended from device 10A).

FIG. 6 shows how content 90 may be displayed across two devices (devices 10A and 10B) that are not adjacent to each other and that do not have the same angular orientation. If desired, video may be streamed from device 10A or otherwise provided to devices 10A and 10B in a configuration in which the four corners of the video content are aligned respectively with the four corners of surface 70 (as an example). In this type of scenario, the display of each portable device on surface 70 may serve as a window into the streamed content. A first subset of the video or other content may be displayed on display 50A in an orientation and position that is aligned with surface 70 and a second subset of the video or other content may be displayed on display 50B in an orientation and position that is aligned with surface 70. A user may move devices 10A and 10B to different portions of charging surface 70 and/or may add additional devices in order to view additional portions of the content.

Figure 7:
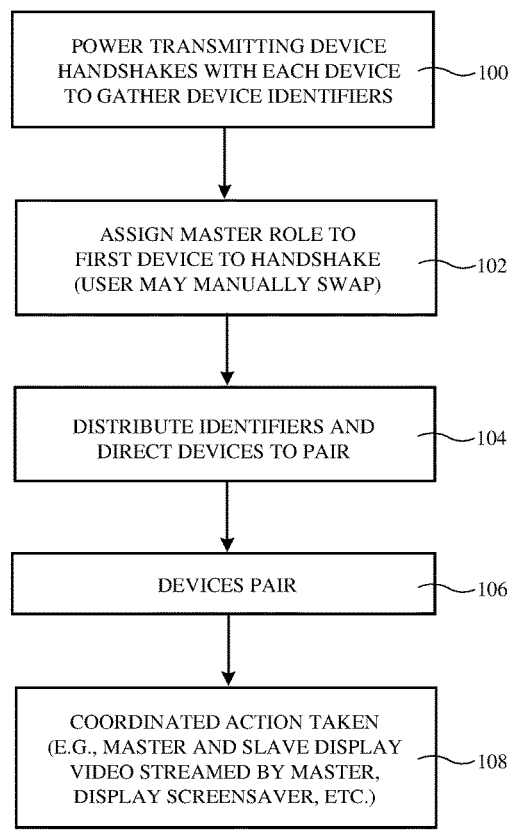
FIG. 7 is a flow chart of illustrative operations involved in coordinating the operation of multiple portable electronic devices on a common wireless charging surface in accordance with an embodiment.

Illustrative operations that may be performed by devices 12 and 10 in gathering position and orientation information and in presenting content on devices 10 based on this information are shown in FIG. 7.

During the operations of block 100, device 12 may communicate with each device 10 to gather device identifiers for devices 10. The device identifiers may be, for example, Bluetooth® identifiers, WiFi® device identifiers, or other suitable device identifiers.

During the operations of block 102, device 12 may assign a master role to one of devices 10 (e.g., the first device 10 to communicate with device 12) and may assign a slave role to another of devices 10 (or to multiple slave devices 10). If desired, a user may be presented with an on-screen menu option on one or more of devices 10 or may otherwise be provided with an opportunity to supply input to change the master and slave assignments of devices 10.

During the operations of block 104, the device identifiers may be distributed by device 12 to each of devices 10 and devices 10 may be instructed to pair with each other (e.g., using Bluetooth® or WiFi® pairing, etc.). Devices 10 may pair during the operations of block 106. If position and orientation information has not previously been gathered, device 12 and devices 10 may identify the positions and orientations of devices 10, as described in connection with the operations of FIG. 4. This information may then be distributed among devices 12 and 10.

During the operations of block 108, devices 10 may be operated in a coordinated fashion. For example, the master device may display a video or other media item on the display of that master device and may wirelessly stream or otherwise distribute another portion of the video or other media item to one or more slave devices on charging surface 70 (e.g., a paired slave device). The known position and orientation of each device (e.g., the position and orientation information gathered during the operations of FIG. 4) may be used in determining which portions of the video or other item should be displayed on each device, as described in connection with the illustrative examples of FIGS. 5 and 6. If desired, touch screen functionality, device-to-device communications functions, and/or other device functions may likewise be coordinated among multiple devices based on the known position and orientation information of devices 10. For example, a user may place multiple devices 10 on charging surface 70 and may supply touch gesture input across the touch sensors on the displays of each of these multiple devices. Files and other information may be exchanged between adjacent devices (e.g., by swiping a file icon in the direction of an adjacent receiving device). The use of position and orientation information to display screen savers, video, and other visual content (e.g., still images, text for documents, etc.) across the displays of multiple devices 10 in a coordinated fashion is merely illustrative.

The operations of devices 12 and 10 of system 8 (e.g., the operations of FIG. 4 and FIG. 7) may be performed by control circuitry 42 and/or 20. During operation, this control circuitry (which may sometimes be referred to as processing circuitry, processing and storage, computing equipment, a computer, etc.) may be configured to perform the methods of FIGS. 4 and 7 (e.g., using dedicated hardware and/or using software code running on hardware in system 10 such as control circuitry 42 and/or 20). The software code for performing these methods, which may sometimes be referred to as program instructions, code, data, instructions, or software, may be stored on non-transitory (tangible) computer readable storage media in control circuitry 42 and/or 20 such as read-only memory, random-access memory, hard drive storage, flash drive storage, removable storage medium, or other computer-readable media and may be executed on processing circuitry such as microprocessors and/or application-specific integrated circuits with processing circuits in control circuitry 42 and/or 20.

The foregoing is merely illustrative and various modifications can be made to the described embodiments. The foregoing embodiments may be implemented individually or in any combination.

What is claimed is:

1. A wireless power transmitting device having a wireless charging surface configured to provide wireless power respectively to at least a first electronic device and a second electronic device resting on the wireless charging surface, wherein the first electronic device and the second electronic device are configured to determine a first orientation of the first electronic device on the wireless charging surface and a second orientation of the second electronic device on the wireless charging surface based on an output received from the wireless power transmitting device, the wireless power transmitting device comprising:
    power transmitting circuitry having a coil array that is configured to transmit alternating current electromagnetic signals;
    at least one component configured to supply the output; and
    control circuitry configured to coordinate, at least in part, a content presentation on the first electronic device and the second electronic device, respectively, based at least on the first orientation and the second orientation.

2. The wireless power transmitting device of claim 1 wherein the output comprises a magnetic field and wherein the at least one component comprises a magnet that produces the magnetic field.

3. The wireless power transmitting device of claim 1 wherein the output comprises a magnetic field and wherein the at least one component comprises an electromagnet that is separate from the coil array.

4. The wireless power transmitting device of claim 1 wherein the output comprises a magnetic field and wherein the at least one component comprises a coil in the coil array.

5. The wireless power transmitting device of claim 1 wherein the output comprises a sound and wherein the at least one component comprises an audio transducer configured to produce the sound.

6. The wireless power transmitting device of claim 1 wherein the control circuitry is further configured to coordinate the content presentation by providing a first device identifier from the first electronic device to the second electronic device and by providing a second device identifier from the second electronic device to the first electronic device and wherein the first electronic device and the second electronic device use the first device identifier and the second device identifier to communicate.

7. The wireless power transmitting device of claim 1 wherein the control circuitry is further configured to coordinate the content presentation by designating the first electronic device as a master device that displays content and that wirelessly transmits the content and by designating the second electronic device as a slave device that receives the transmitted content and that displays the received transmitted content.

8. The wireless power transmitting device of claim 1 wherein the first orientation and the second orientation comprise a first angular orientation and a second angular orientation and wherein the wireless power transmitting device comprises a coil in the coil array that is configured to supply a wireless signal that the first electronic device and the second electronic device are configured to sense to determine a first lateral position of the first electronic device on the wireless charging surface and a second lateral position of the second electronic device on the wireless charging surface.

9. The wireless power transmitting device of claim 8 wherein the output comprises a magnetic field and wherein the at least one component is configured to produce the magnetic field.

10. A wireless power transmitting device having a wireless charging surface configured to provide wireless power to at least a first electronic device and a second electronic device resting on the wireless charging surface, respectively, the wireless power transmitting device comprising:
  power transmitting circuitry having a coil array that is configured to transmit alternating current electromagnetic signals to the first electronic device and the second electronic device;
  at least one component configured to gather an input from the first electronic device and the second electronic device, respectively; and
  control circuitry configured to:
    determine, using the gathered input, a first orientation of the first electronic device on the wireless charging surface and a second orientation of the second electronic device on the wireless charging surface; and
    coordinate, at least in part, a content presentation on the first electronic device and the second electronic device, respectively, based at least on the first orientation and the second orientation.

11. The wireless power transmitting device of claim 10 wherein the component comprises a microphone configured to:
  determine the first orientation using a sound received from the first electronic device; and
  determine the second orientation using a sound received from the second electronic device.

12. The wireless power transmitting device of claim 10 wherein the at least one component comprises coils in the coil array that are configured to receive magnetic signals from coils in the first electronic device and the second electronic device.

13. The wireless power transmitting device of claim 10 wherein the control circuitry is further configured to coordinate the content presentation by providing a first device identifier from the first electronic device to the second electronic device and by providing a second device identifier from the second electronic device to the first electronic device.

14. The wireless power transmitting device of claim 13 wherein the control circuitry is further configured to coordinate the content presentation by designating the first electronic device as a master device that supplies content and by designating the second electronic device as a slave device that receives and displays at least part of the content supplied by the master device.

15. A non-transitory computer readable storage medium having instructions stored thereon that, when executed by a computing device, cause the computing device to perform the following operations comprising:
  gathering a device identifier associated with a first wireless power receiving device placed on a wireless charging surface;
  providing the device identifier associated with the first wireless power receiving device to a second wireless power receiving device placed on the wireless charging surface; and
  coordinating display of content on the second wireless power receiving device based at least on the device identifier associated with the first wireless power receiving device.

16. The non-transitory computer readable storage medium of claim 15, wherein the coordinating display further comprises:
  displaying a first portion of the content on the first wireless power receiving device and causing the display of a second portion of the content on the second wireless power receiving device.

17. A wireless power transmitting device having a wireless charging surface configured to provide wireless power to at least a first electronic device and a second electronic device resting on the wireless charging surface, respectively, the wireless power transmitting device comprising:
  power transmitting circuitry having a coil array that is configured to transmit alternating current electromagnetic signals to the first electronic device and to the second electronic device; and
  control circuitry configured to:
    gather a device identifier associated with the first electronic device, and
    provide the device identifier associated with the first electronic device to the second electronic device, wherein content displayed on the first electronic device and the second electronic device is coordinated based at least on the device identifier associated with the first electronic device.

18. The wireless power transmitting device of claim 17, wherein the control circuitry is further configured to:
  gather an additional device identifier associated with the second electronic device; and
  provide the additional device identifier associated with the second electronic device to the first electronic device, wherein the content displayed on the first electronic device and the second electronic device is coordinated based at least on the additional device identifier associated with the second electronic device.

19. The wireless power transmitting device of claim 17, wherein the first electronic device and the second electronic device are configured to determine a first orientation of the first electronic device on the wireless charging surface and a second orientation of the second electronic device on the wireless charging surface based on an output received from the wireless power transmitting device, the wireless power transmitting device further comprising at least one component configured to supply the output.

20. The wireless power transmitting device of claim 19 wherein the output comprises a magnetic field and wherein the at least one component comprises an electromagnet that is separate from the coil array.

21. The wireless power transmitting device of claim 19 wherein the output comprises a magnetic field and wherein the at least one component comprises a coil in the coil array.

22. The wireless power transmitting device of claim 19 wherein the output comprises a sound and wherein the at least one component comprises an audio transducer configured to produce the sound.

23. The wireless power transmitting device of claim 19 wherein the control circuitry is further configured to coordinate display of the content by designating the first electronic device as a master device that displays the content and that wirelessly transmits the content and by designating the second electronic device as a slave device that receives the transmitted content and that displays the received transmitted content.

24. The wireless power transmitting device of claim 19 wherein the first orientation and the second orientation comprise a first angular orientation and a second angular orientation, respectively, and wherein the wireless power transmitting device comprises a coil in the coil array that is configured to supply a wireless signal that the first electronic device and the second electronic device are configured to sense to determine a first lateral position of the first electronic device on the wireless charging surface and a second lateral position of the second electronic device on the wireless charging surface.

25. The wireless power transmitting device of claim 24 wherein the output comprises a magnetic field and wherein the at least one component is configured to produce the magnetic field.

26. A wireless power receiving device configured to receive wireless power from a wireless power transmitting device while the wireless power receiving device is placed on a wireless charging surface of the wireless power transmitting device, the wireless power receiving device comprising:
   wireless power receiving circuitry configured to receive the wireless power;
   control circuitry coupled to the wireless power receiving circuitry and configured to receive a device identifier associated with an additional wireless power receiving device placed on the wireless charging surface of the wireless power transmitting device; and
   a display coupled to the control circuitry, wherein the control circuitry is configured to display content on the display based at least on the received device identifier associated with the additional wireless power receiving device.

27. The wireless power receiving device defined in claim 26, wherein the control circuitry is configured to receive the device identifier from the wireless power transmitting device.

28. The wireless power receiving device defined in claim 26, wherein the wireless power receiving device is configured to determine a first orientation of the wireless power receiving device and a second orientation of the additional wireless power receiving device based on an output received from the wireless power transmitting device.

29. The wireless power receiving device defined in claim 28, wherein the output comprises a magnetic field produced by the wireless power transmitting device.

30. The wireless power receiving device of claim 28 wherein the output comprises a sound produced by the wireless power transmitting device.

31. The wireless power receiving device of claim 28 wherein the control circuitry is configured to operate as a master device that displays the content and that wirelessly transmits the content to the additional wireless power receiving device.

* * * * *